(12) United States Patent
Lei et al.

(10) Patent No.: US 9,920,835 B2
(45) Date of Patent: Mar. 20, 2018

(54) PISTON DEVICE AND PRESSURE REGULATOR USING SAME

(71) Applicant: FISHER JEON GAS EQUIPMENT (CHENGDU) CO., LTD., Sichuan (CN)

(72) Inventors: Yanwei Lei, Chengdu (CN); Min Qiu, Chengdu (CN); Xuan Yu, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/764,118

(22) PCT Filed: Jan. 24, 2014

(86) PCT No.: PCT/CN2014/071302
§ 371 (c)(1),
(2) Date: Jul. 28, 2015

(87) PCT Pub. No.: WO2014/114256
PCT Pub. Date: Jul. 31, 2014

(65) Prior Publication Data
US 2015/0362070 A1 Dec. 17, 2015

(30) Foreign Application Priority Data

Jan. 28, 2013 (CN) .......................... 2013 1 0051398
Jan. 28, 2013 (CN) ..................... 2013 2 0076547 U

(51) Int. Cl.
*F16K 1/36* (2006.01)
*F16J 1/09* (2006.01)
(Continued)

(52) U.S. Cl.
CPC . *F16J 1/09* (2013.01); *F16J 1/12* (2013.01); *F16K 1/36* (2013.01); *F16K 1/487* (2013.01)

(58) Field of Classification Search
CPC ... F16K 1/36; F16K 1/48; F16K 1/487; F16K 3/267; F16K 3/26
(Continued)

(56) References Cited

U.S. PATENT DOCUMENTS 2,886,283 A * 5/1959 Natho ........................ F16K 1/42
251/175
3,519,245 A * 7/1970 Hyde ...................... F16K 1/482
251/86

(Continued)

FOREIGN PATENT DOCUMENTS

CN 201236952 Y 5/2009
CN 201539579 U 8/2010
(Continued)

OTHER PUBLICATIONS

Hu et al., CN201236952 machine translation.*
Search Report for PCT/CN2014/071302, dated Apr. 3, 2014.
Written Opinion for PCT/CN2014/071302, dated Apr. 3, 2014.

*Primary Examiner* — John Fox
(74) *Attorney, Agent, or Firm* — Marshall, Gerstein & Borun LLP

(57) ABSTRACT

A piston device and a pressure regulator including the piston device. The piston device includes a piston body and a baffle plate having a surface provided with openings. The baffle plate is arranged in the piston body and divides the piston body into an upper first area and a lower second area. The piston device beneficially improves the stress balance of the first area and the second area, thereby improving the stability of the overall system.

11 Claims, 3 Drawing Sheets

(51) Int. Cl.
*F16K 1/48* (2006.01)
*F16J 1/12* (2006.01)

(58) Field of Classification Search
USPC .............................. 251/282, 324; 137/625.33
See application file for complete search history.

(56) References Cited

U.S. PATENT DOCUMENTS

| | | | | |
|---|---|---|---|---|
| 3,834,666 A * | 9/1974 | Keith | .................. | F16K 1/34 |
| | | | | 137/625.38 |
| 3,892,384 A * | 7/1975 | Myers | .................. | F16K 39/022 |
| | | | | 251/282 |
| 4,235,413 A * | 11/1980 | Baker | .................. | F16K 31/025 |
| | | | | 236/68 A |
| 6,095,490 A | 8/2000 | Nakano et al. | | |
| 6,102,366 A * | 8/2000 | Perez C. | .................. | F16K 7/20 |
| | | | | 251/175 |
| 6,394,135 B2 * | 5/2002 | Erickson | .................. | F16K 39/04 |
| | | | | 137/625.38 |
| 6,997,211 B2 * | 2/2006 | Alman | .................. | F16K 27/00 |
| | | | | 137/625.33 |
| 7,832,426 B2 * | 11/2010 | Wears | .................. | F16K 11/044 |
| | | | | 137/625.38 |
| 8,356,622 B2 * | 1/2013 | Wears | .................. | F16K 3/246 |
| | | | | 137/454.6 |
| 8,820,708 B2 * | 9/2014 | Bell | .................. | F16K 3/246 |
| | | | | 137/625.38 |
| 9,022,070 B2 * | 5/2015 | Anderson | .................. | 137/315.27 |
| 2002/0017327 A1 * | 2/2002 | Kawaai | .................. | F16J 9/08 |
| | | | | 137/625.3 |
| 2005/0000577 A1 * | 1/2005 | Alman | .................. | F16K 27/00 |
| | | | | 137/625.33 |
| 2013/0320252 A1 * | 12/2013 | Hageman | .................. | F16K 3/246 |
| | | | | 251/324 |
| 2015/0362070 A1 * | 12/2015 | Lei | .................. | F16K 1/36 |
| | | | | 92/82 |

FOREIGN PATENT DOCUMENTS

| | | |
|---|---|---|
| CN | 101858440 A | 10/2010 |
| CN | 102392911 A | 3/2012 |
| CN | 102777645 A | 11/2012 |
| CN | 203131058 U | 8/2013 |
| JP | H08109972 A | 4/1996 |
| JP | 2004019918 A | 1/2004 |

* cited by examiner

PISTON DEVICE AND PRESSURE REGULATOR USING SAME

TECHNICAL FIELD

The present disclosure relates to a piston device and a pressure regulator using the same.

BACKGROUND ART

In a pressure regulator, such as the one illustrated in FIG. 1, a piston device can be used for controlling and regulating pressure of an outlet by having one end of the piston device connected with and driven by a valve rod. In the pressure regulator illustrated in FIG. 1, a valve port 300 is arranged between an inlet 100 and an outlet 200, one end of a valve rod 110 is connected with a piston device 120, and the valve rod 110 drives the piston device 120 to move up and down to control the opening and closing of the valve port 300 so as to adjust the pressure of the outlet 200.

Usually, an engineer arranges a perforated baffle plate 130 at the top of the piston device 120, such that a medium coming from the inlet 100 flows into the piston device 120 via the baffle plate 130; thus, the pressure on the upper surface of the baffle plate 130 is equal to the pressure on the lower surface of the baffle plate. Such a design is, however, only based on the hypothesis of a static medium. Once the medium flows, the medium enters a lower part area B of the baffle plate 130 via an upper part area A of the baffle plate 130, and the flow speed of the medium at the upper part area A of the baffle plate 130 is obviously larger than that of the medium at the lower part area B of the baffle plate 130. Therefore, the fluid flow state of the area A is very unstable, such that the baffle plate 130 is subjected to an unstable force, thereby influencing the stability of the supply of the medium at a downstream outlet 200. Furthermore, as a lower cavity of the baffle plate is closed, the flow speed of the medium inside the cavity is very low, and as the speed is inversely proportional to the pressure, i.e., the pressure is small if the speed is high and the pressure is large if the speed is low, the pressure under the baffle plate 130 is larger than the pressure on the upper surface of the baffle plate 130. In turn, the stresses on the upper and lower parts of the piston device are unbalanced, which influences the stability of the supply of the medium downstream as well.

SUMMARY OF THE INVENTION

The invention provides a piston device that can improve the stress conditions on and under a baffle plate of the piston device and improve the stability of the whole system when a fluid medium flows via the piston device.

In accordance with a first exemplary aspect of the present invention, a piston device is provided that includes a piston body and a baffle plate having openings. The baffle plate is arranged in the piston body, and divides the piston body into an upper first area and a lower second area.

In one preferred form, the distance between the baffle plate and an upper end part of the piston body is larger than or equal to 3 mm.

In another preferred form, the distance between the baffle plate and the upper end part of the piston body is between 4 mm and 35 mm.

In another preferred form, the distance between the baffle plate and the upper end part of the piston body is 5, 10, 15, 20, 25 or 30 mm.

In another preferred form, the piston body is also provided with a closing element, and the distance between the baffle plate and the upper end part of the piston body comprises to the distance between the baffle plate and the closing element.

In another preferred form, the closing element of the piston body can be a cutting edge, rubber part, or metal end surface.

In another preferred form, a positioning sleeve is arranged outside the piston body, and seal rings are arranged between the positioning sleeve and the piston body. The seal rings are O-shaped, Y-shaped or starlike.

In another preferred form, a guide belt arranged between the positioning sleeve and the piston body.

In another preferred form, the piston body and the baffle plate are threadingly coupled to one another.

By arranging the baffle plate in the piston body in a manner that divides the piston body into the first area and the second area at upper and lower positions respectively, fluid medium flowing via the piston device can enter the first area of the piston and enter the second area via the perforated baffle plate, and the fluid medium is buffered in the first area, so that the fluid medium is balanced between the first area and the second area.

In another preferred form, the distance between the baffle plate and the upper end part of the piston body is larger than or equal to 3 mm; in turn, the system performance of the whole piston device tends to be stable. More particularly, when the distance between the baffle plate and the upper end part of the piston body is equal to 4, 5, 10, 15, 20, 25, or 30 mm, the system performance is the best.

In another preferred form, the piston body is also provided with a closing element to help to realize a better sealing effect between the piston device and a valve port.

In another preferred form, the distance between the baffle plate and the upper end part of the piston body refers to the distance between the baffle plate and the closing element.

In another preferred form, the closing element can be a cutting edge, a rubber part, or a metal end surface. When the closing element is a cutting edge, the distance between the baffle plate and the upper end part of the piston body refers to the distance between the baffle plate and the cutting edge. When the closing element is a rubber part, the distance between the baffle plate and the upper end part of the piston body refers to the distance between the baffle plate and the rubber part. When the closing element is a metal end surface, the distance between the baffle plate and the upper end part of the piston body refers to the distance between the baffle plate and the metal end surface.

In another preferred form, a positioning sleeve is arranged outside the piston body, so the piston device can be tightly wrapped, thereby preventing radial displacement of the piston device when moved up and down.

In another preferred form, seal rings are arranged between the positioning sleeve and the piston body. When the piston device contacts the valve port, a pressure regulator using the piston device is closed, and in this position, the seal rings between the positioning sleeve and the piston body achieve a sealing effect, preventing the medium from the inlet from entering the outlet side.

In another preferred form, a guide belt is arranged between the positioning sleeve and the piston body. The piston device is further wrapped in the positioning sleeve, and the guide belt serves to guide and lubricate the piston body.

In another preferred form, the piston body and the baffle plate can be separately formed and conveniently detachably connected. As an example, the baffle plate can be threadingly connected to the piston body.

In another preferred form, the piston body and the baffle plate can be integrally formed with one another.

In accordance with a second exemplary aspect of the present invention, a pressure regulator is provided. The pressure regulator includes the abovementioned piston device as well as an inlet, an outlet, a valve port arranged between the inlet and the outlet, and a valve rod One end of the valve rod is connected with the piston device, and the valve rod drives the piston device to move up and down to control the opening and closing of the valve port, thereby controlling the pressure of a medium flowing from the inletto the outlet.

In one preferred form, the pressure regulator further includes a sealing rubber, a cutting edge, or a metal end surface arranged at one surface of the valve port opposite the piston device.

In another preferred form, one end of the valve rod is in threaded connection with the baffle plate.

Besides the above-described advantages provided by the piston device, the pressure regulator described herein also has the advantage of stable performance. In some preferred forms, in order to achieve a better sealing effect, the piston body includes a closing element, which can take the form of a cutting edge, a rubber part, or a metal end surface. When the closing element of the piston device is the cutting edge or metal end surface, one surface of the valve port opposite to the piston device is provided with the sealing rubber. When the closing element of the piston device is the sealing rubber, one surface of the valve port opposite to the piston device is provided with the cutting edge or metal end surface. When the closing element of the piston device is the metal end surface, the valve port is provided with the metal end surface or sealing rubber corresponding to the metal end surface. In sum, due to the matching design of the cutting edge or metal end surface and the sealing rubber, the cutting edge or metal end surface can be cut into the sealing rubber, thus further achieving a better sealing effect.

DETAILED DESCRIPTION OF THE DRAWINGS

The following will describe the preferable embodiments with reference to the drawings which constitute one part of the present invention. The attached drawings illustrate the specific embodiments for achieving the present invention by way of example. The illustrated embodiments are not intended to limit all of the embodiments of the present invention. It may be appreciated that without departing from the scope of the present invention, other embodiments may be used, or some structural or logical changes may be possible. Therefore, the following specific explanations are not meant as a limitation of the present invention, and the scope of the present invention is defined by the attached claims.

Embodiment I

Figure 1:
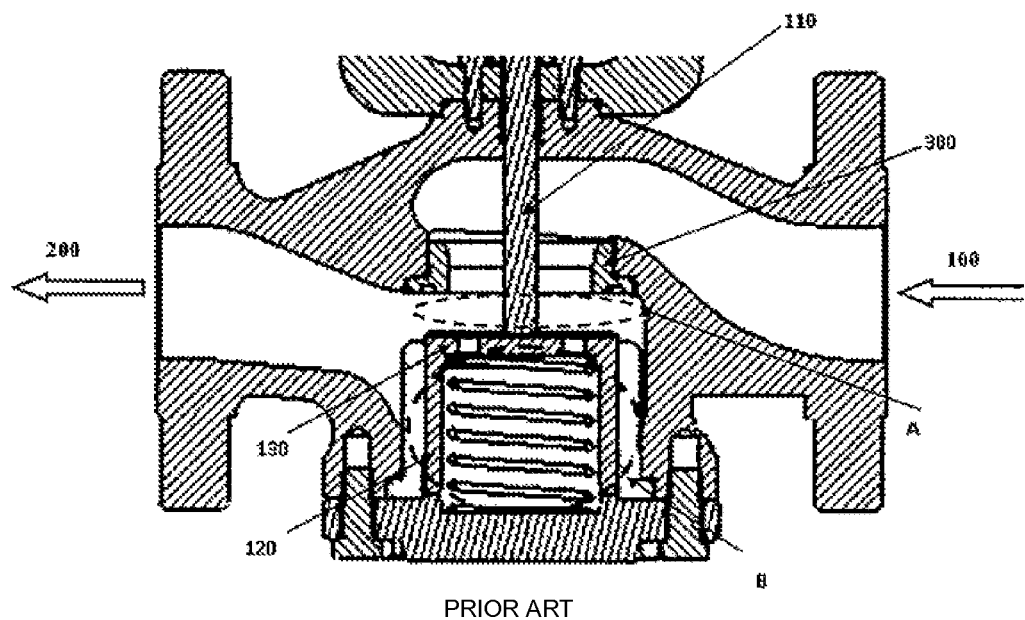
FIG. 1 is a schematic diagram of a piston device used in a conventional pressure regulator.
Figure 2:
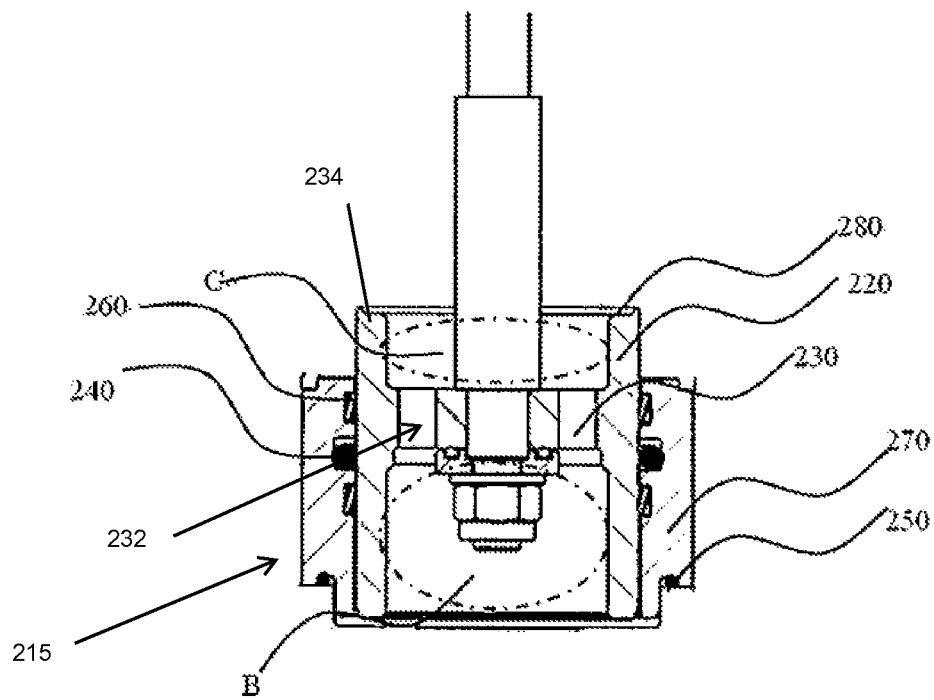
FIG. 2 is a schematic diagram of one exemplary embodiment of a piston device constructed in accordance with the teachings of the present invention.

In one embodiment constructed in accordance with the teachings of the present invention, a piston device 215 is provided. As shown in FIG. 2, the piston device 215 comprises a piston body 220 and a baffle plate 230 having a surface provided with openings 232. The baffle plate 230 is arranged in the piston body 220 and divides the piston body 220 into an upper first area C and a lower second area B. Thus, when a flowing medium enters the piston body 220, is buffered by the first area C and enters the second area B, due to the certain space of the first area C, difference between the flow speed of the flowing medium in the first area C and the flow speed of the flowing medium in the second area B is reduced. This, in turn, reduces the pressure difference between the first area C and the second area B, thereby stabilizing the input and output pressures of the fluid medium flowing through the piston device 215 and improving the stability of the fluid medium.

When the distance between the baffle plate 230 and an upper end part 234 of the piston body 220 is larger than or equal to 3 mm, namely, the height of the first area C is larger than or equal to 3 mm, the relationship between the input and output pressure of the fluid medium flowing through the piston device 215 tends to be stable. When, for example, the distance between the baffle plate 230 and the upper end part 234 of the piston body 220 is between 4 and 35 mm, the relationship between the input and output pressure of the fluid medium flowing through the piston device 215 is even more stable. When the distance between the baffle plate 230 and the upper end part 234 of the piston body is 5, 10, 15, 20 or 25 mm, the whole system is the most stable.

The piston device 215 further includes a closing element arranged at the upper end part 234 of the piston body 220. The closing element is matched with a valve port outside the piston device 215 for operational use. The closing element can be a cutting edge 280 or metal end surface, with the valve port provided with sealing rubber matched with the cutting edge 280 or metal end surface. The cutting edge 280 or metal end surface can be directly cut into the sealing rubber to further enhance the sealing effect. The closing element can also be a rubber part, with the valve port provided with a cutting edge or metal end surface matched with the rubber part. When the closing element is a metal end surface, the valve port is also provided with a metal end surface corresponding to and matched with the metal end surface for operational use. In this case, the distance between the baffle plate 230 and the upper end part 234 of the piston body 220 refers to the distance between the baffle plate 230 and the closing element.

In addition, in order to further fix the piston device 215 and improve the stability of the piston device 215, a positioning sleeve 270 can be arranged outside the piston body 220. The positioning sleeve 270 can tightly wrap the piston device, so that the piston device 215 does not radially displace when moving up and down. The piston body 220 and the baffle plate 230 can be separately formed and connected, thereby enabling a convenient detachment, or can be integrally formed, so as to ensure the stability of the system.

Seal rings 240 and 250 are arranged between the positioning sleeve 270 and the piston body 220, such that when the piston device 215 contacts with the outer valve port, the seal rings 240 and 250 can prevent inlet pressure from entering the outlet side. The seal rings 240, 250 can be O-shaped, Y-shaped or starlike.

In addition, a guide belt 260 is arranged between the positioning sleeve 270 and the piston body 220. The piston device 215 is further wrapped in the positioning sleeve 270, thus guiding and lubricating effects are achieved.

Embodiment II

Figure 3:
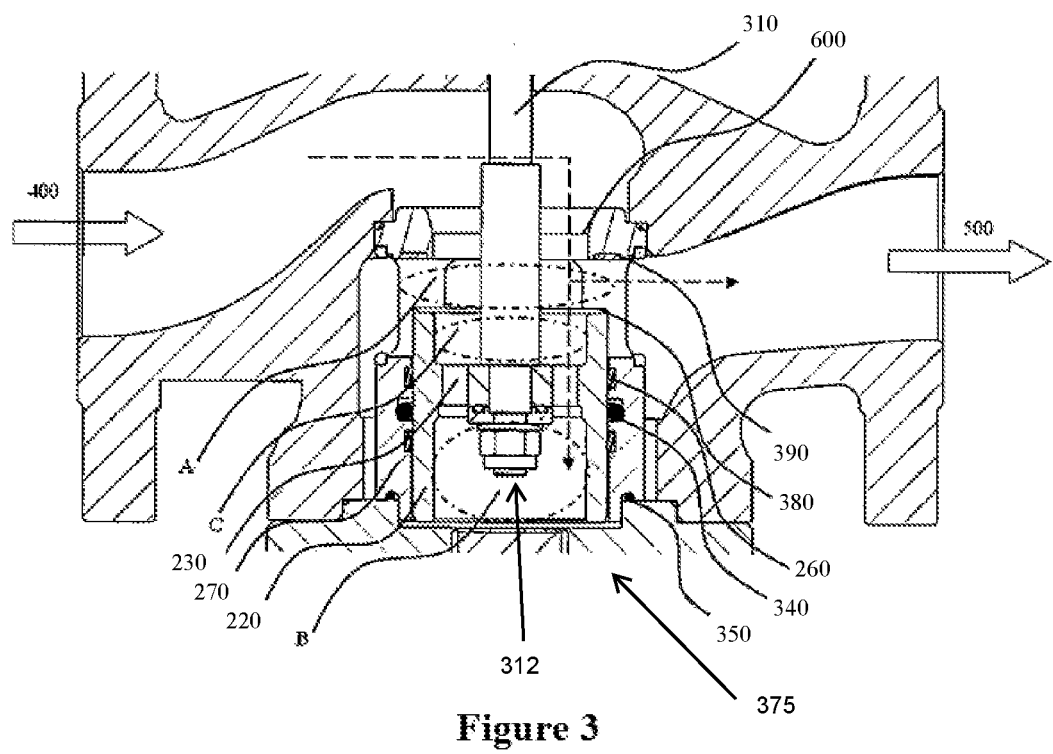
FIG. 3 is a schematic diagram of one exemplary embodiment of a pressure regulator constructed in accordance with the teachings of the present invention.

In another embodiment constructed in accordance with the teachings of the present invention, a pressure regulator 375 is provided. As shown in FIG. 3, of the pressure regulator 375 includes the piston device 215 described in connection with the Embodiment I; details regarding the piston device 215 are not repeated herein. As also shown in FIG. 3, the pressure regulator 375 further includes an inlet 400, an outlet 500, a valve port 600, and a valve rod 310. The valve port 600 is arranged between the inlet 400 and the outlet 500, and a third area A is formed between the valve port 600 and the outlet 500. One end 312 of the valve rod 310 is connected to the piston device 215, such that the valve rod 310 drives the piston device to move up and down to control the opening and closing of the valve port 600, and thus control the pressure of a medium, which enters from the inlet 400 and flows out of the outlet 500. The one end 312 of the valve rod 310 is in threaded connection with the baffle plate 230, which allows the pressure regulator 375 to be conveniently detached.

When the piston device 215 is spaced from the valve port 600, the fluid medium flows via the third area A from the inlet 400, flows out from the outlet 500, and simultaneously enters the first area C and the second area B of the piston device. Through buffering of the first area C and the second area B, pressures on the upper and lower parts of the piston device 215 tend to be consistent, thereby reducing the unbalanced pressure that would otherwise be present on the upper and lower parts of the piston device 215. As a result, the pressure of the fluid medium flowing out at the outlet 500 tends to be stable.

When the height of the first area C or the distance between the baffle plate 230 and the upper end part 234 of the piston body 220 reaches a certain value, the pressure in the whole pressure regulator tends to be stable. Thus, the supplying pressure of the medium at the downstream outlet 500 tends to be stable.

The pressure regulator 375 further comprises sealing rubber 390 arranged on the valve port 600. The piston device 215 is provided with a cutting edge 380, and when the piston device gets close to the valve port, the cutting edge 380 is cut into the sealing rubber 390 to enhance of the seal between the piston device 215 and the valve port 600. Alternatively, the closing element of the piston device 215 can be sealing rubber, in which case the valve port 600 is provided with a cutting edge or metal end surface.

Figure 4:
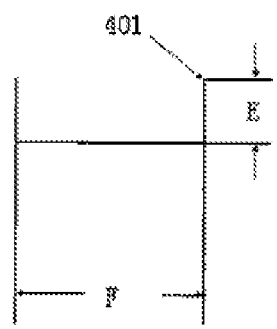
FIG. 4 depicts a ratio of the height to diameter of a baffle plate of the piston device of FIG. 2.

In order to further describe technical effects of the invention, system pressure detection data of the pressure regulator 375 are listed as follows:

FIG. 4 is a diagram of the ratio of the height to diameter of the baffle plate 230 of the piston device 215, wherein F is the diameter of the piston device 215 and E is the distance between the baffle plate 230 and the upper end part 234 of the piston device 215. When the piston device 215 is also provided with the closing element 401, E is the distance between the baffle plate 230 and the closing element 401.

Figure 5:
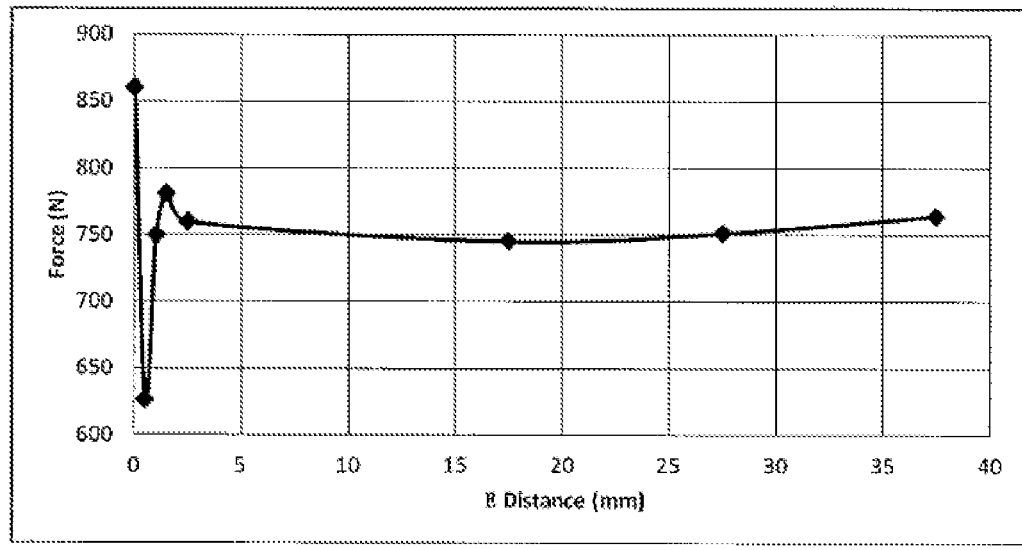
FIG. 5 is aschematic diagram of system pressure detection of the piston device of FIG. 2 in the pressure regulator of FIG. 3.

FIG. 5 is a schematic diagram of system pressure detection of the piston device 215 in the pressure regulator 375. When 50 mm is selected as the diameter of the piston device 215, the pressure of the inlet 400 is 30 bar, and the pressure of the outlet 500 is controlled at 2.5 bar, through data analysis, FIG. 5 shows that when the distance between the baffle plate 230 and the upper end part 234 of the piston device 215 is larger than 3 mm and smaller than 38 mm, the whole system pressure tends to be in a stable state. When the distance is between 4 mm and 31 mm, the upper and lower fluctuation of a system pressure curve is the most stable. When the distance is 10 mm±2 mm, 15 mm, and 27 mm±2 mm, the system pressure curve is consistent.

Figure 6:
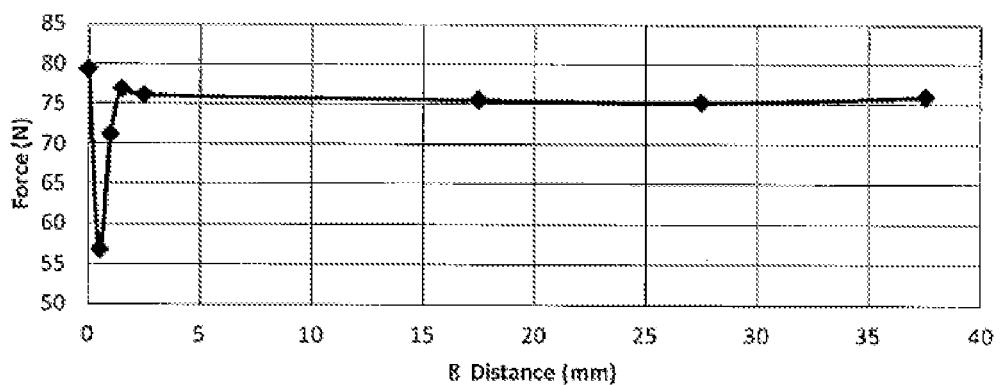
FIG. 6 is another schematic diagram of system pressure detection of the piston device of FIG. 2 in the pressure regulator of FIG. 3.

FIG. 6 is another schematic diagram of system pressure detection of the piston device 215 in the pressure regulator 375. When 50 mm is selected as the diameter of the piston device 215, the pressure of the inlet 400 is 3 bar, and the pressure of the outlet 500 is controlled at 2.5 bar, through data analysis, FIG. 6 shows that when the distance between the baffle plate 230 and the upper end part 234 of the piston device 215 is larger than 3 mm and smaller than 38 mm, the whole system pressure tends to be in a stable state, and when the distance is 4, 5, 10, 15, 20, 25, 30, or 35 mm, the pressure curve is stable.

When the piston device 215 gets close to the valve port 600, the fluid medium can enter the first area C and the second area B of the piston device from the inlet 400, and pressures of the inlet 400, the piston device 215, and the sleeve 270 can be relieved as well and the system burden of the whole pressure regulator 375 is reduced.

It will be appreciated that the pressure regulator 375 also has the advantages of the piston device 215 described in connection with Embodiment I. Wherein, no matter whether the piston device 215 is close to or away from the valve port 600, seal rings 340 and 350 can seal the medium in the first area C and the second area B, and the medium cannot flow to the downstream outlet 500. The seal rings 340, 350 can be O-shaped, Y-shaped or starlike.

The pressure regulator 375 can regulate both liquid mediums and gas mediums.

The invention claimed is:
1. A pressure regulator, comprising:
   a valve body having an inlet, an outlet, and a valve port arranged between the inlet and the outlet;
   a valve rod extending through the valve port; and
   a piston device, comprising:
      a piston body comprising a closing element movable relative to the valve port between an open position, wherein the closing element is spaced from the valve port to allow fluid flow through the valve port, and a closed position, wherein the closing element sealingly engages the valve port to prevent fluid flow through the valve port; and
      a baffle plate having a surface provided with openings, wherein the baffle plate is arranged in the piston body and divides the piston body into an upper area and a lower area, the upper area defined between the baffle plate and the closing element, and the lower area being larger than the upper area,
   wherein one end of the valve rod is connected with the piston device, and the valve rod drives the piston device to move up and down to control the opening and closing of the valve port, thereby controlling the pressure of a medium flowing from the inlet to the outlet.

2. The pressure regulator according to claim 1, further comprising sealing rubber, a cutting edge, or a metal end surface arranged at one surface of the valve port opposite the closing element of the piston device.

3. The pressure regulator according to claim 1, wherein the distance between the baffle plate and an upper end part of the piston body is larger than or equal to 3 mm.

4. The pressure regulator according to claim 3, wherein the distance between the baffle plate and the upper end part of the piston body is between 4 and 35 mm.

5. The pressure regulator according to claim 4, wherein the distance between the baffle plate and the upper end part of the piston body is between 5 mm and 30 mm.

6. The pressure regulator according to claim 3, wherein the distance between the baffle plate and the upper end part of the piston body comprises the distance between the baffle plate and the closing element.

7. The pressure regulator according to claim 6, wherein the closing element is a cutting edge, rubber part, or metal end surface.

8. The pressure regulator according to claim 1, further comprising a positioning sleeve arranged outside the piston body, and further comprising seal rings arranged between the positioning sleeve and the piston body.

9. The pressure regulator according to claim 8, further comprising a guide belt further arranged between the positioning sleeve and the piston body.

10. The pressure regulator according to claim 1, wherein the inlet is oriented along an inlet axis, the outlet is oriented along an outlet axis, and the piston device is movable along an axis that is perpendicular to the inlet and outlet axes.

11. The pressure regulator according to claim 1, further comprising a fastener that connects the one end of the valve rod with the piston device, wherein the fastener is arranged in the lower area.

\* \* \* \* \*

UNITED STATES PATENT AND TRADEMARK OFFICE
CERTIFICATE OF CORRECTION

| | |
|---|---|
| PATENT NO. | : 9,920,835 B2 |
| APPLICATION NO. | : 14/764118 |
| DATED | : March 20, 2018 |
| INVENTOR(S) | : Yanwei Lei et al. |

Page 1 of 1

It is certified that error appears in the above-identified patent and that said Letters Patent is hereby corrected as shown below:

In the Specification

At Column 3, Line 9, "rod One" should be -- rod. One --.

At Column 3, Line 14, "inletto" should be -- inlet to --.

At Column 3, Line 53, "aschematic" should be -- a schematic --.

At Column 5, Line 19, "of the pressure" should be -- the pressure --.

At Column 5, Line 57, "enhance of the" should be -- enhance the --.

Signed and Sealed this
Eleventh Day of June, 2019

Andrei Iancu
*Director of the United States Patent and Trademark Office*